May 30, 1933.    R. M. SHERMAN ET AL    1,912,014
FUEL SUPPLY DEVICE FOR LIQUID FUEL BURNERS
Filed March 30, 1931
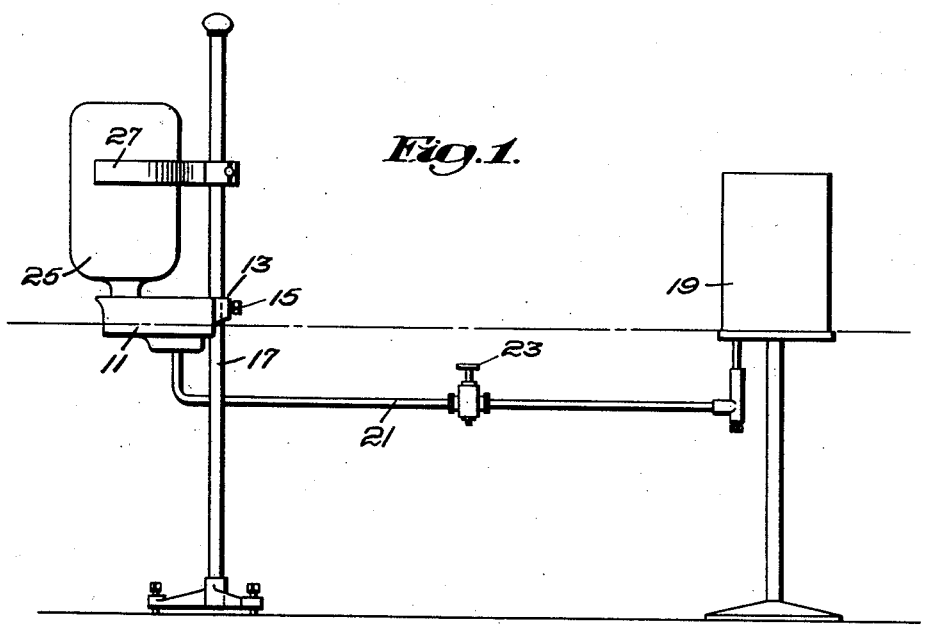
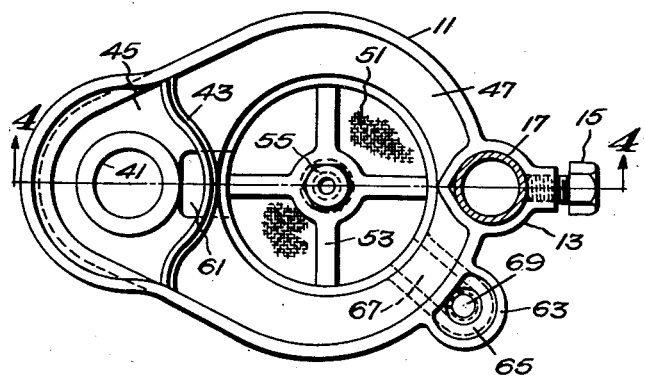
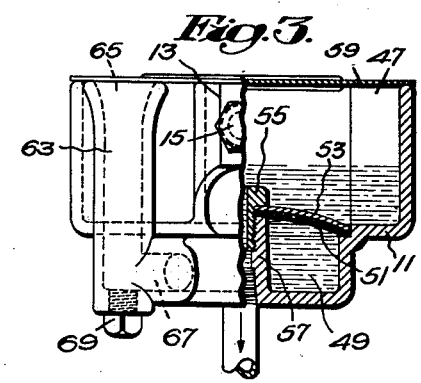
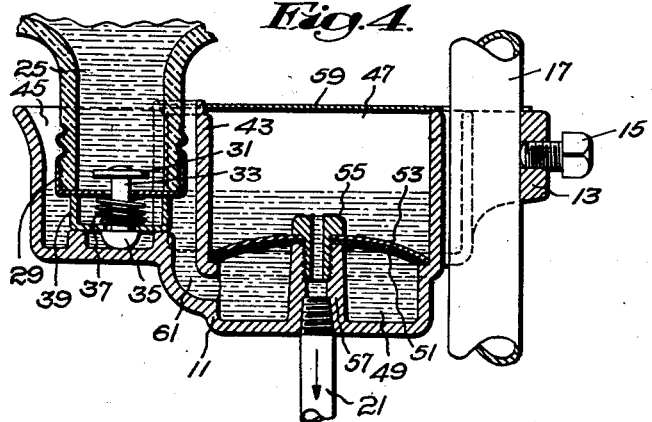
Inventors:
Rollston M. Sherman
Alfred J. Gilbert Patented May 30, 1933

1,912,014

UNITED STATES PATENT OFFICE

RALLSTON M. SHERMAN, OF GLASTONBURY, AND ALFRED J. GILBERT, OF WINDSOR, CONNECTICUT, ASSIGNORS TO THE SILENT GLOW OIL BURNER CORPORATION, OF HARTFORD, CONNECTICUT, A CORPORATION OF CONNECTICUT

FUEL SUPPLY DEVICE FOR LIQUID FUEL BURNERS

Application filed March 30, 1931. Serial No. 526,533.

This invention relates to fuel supply devices for liquid fuel burners, being more particularly intended to provide an improved, simple, convenient and effective form of supply device for use in connection with self-vaporizing burners, such as those of the so-called combustion tube type, where the liquid fuel is supplied to the burner and a constant level maintained and there vaporized and burned with a suitable mixture of air. For descriptive purposes the liquid fuel herein referred to is oil, although other forms of liquid fuel may be employed.

The invention will be best understood by reference to the following description when taken in connection with the accompanying illustration of one specific embodiment thereof, while its scope will be more particularly pointed out in the appended claims.

In the drawing:

Fig. 1 is a side elevation of one form of oil supply device, showing its connection to a typical form of burner;

Fig. 2 is a plan view of a supply member, with the cover and reservoir or bottle removed;

Fig. 3 is an end elevation, partly in section, showing the supply member of Fig. 2; and Fig. 4 is a sectional elevation on the line 4—4 in Fig. 2, showing the end of the inverted bottle applied thereto.

Referring to the drawing and to the embodiment of the invention which is therein shown for illustrative purposes, the supply device comprises a casting 11 having a laterally projecting perforated lug 13 by means of which it may be adjustably secured as to height by the set screw 15 on the upright standard 17 (Fig. 1). This casting, which for descriptive purposes may be referred to as a bowl, provides an oil supply chamber in which a continuously replenished supply of oil is maintained at a constant level and from which it may be delivered by gravity to the base of the burner 19 through an intermediate pipe connection 21 and controlling valve 23. The burner 19 is represented to typify any of the usual forms of combustion tube burners, the oil gravitating into the base of the burner from the constant level supply chamber in the bowl 11.

A constantly replenished supply of oil is maintained in the bowl by any suitable means. A common method of accomplishing this is to provide an oil container or reservoir, air-tight except for a delivery opening, the container being supported above the supply device with its opening within the latter and immersed in and sealed by the oil therein, the latter escaping from the container to replenish the supply chamber under the well-known barometric principle and maintaining a constant level therein as the oil is withdrawn by gravity therefrom.

In the illustrated form of the invention, an oil container in the form of a glass bottle 25 is shown which is placed inverted with its mouth resting in the bowl, the bottle being held in that position by means of two resilient arms 27 secured to the standard 17.

To assist in inverting and placing the bottle in the bowl and removing it therefrom without the danger of leakage or spilling the oil, the bottle is provided with an automatically acting stopper. For this purpose the neck of the bottle has threaded on it (Fig. 4) a metal cap piece 29 having a central discharge opening which, when the bottle is lifted from the base, is automatically closed by a valve 31, but is opened for the escape of the oil when the bottle is positioned in the bowl.

To effect the operation of the valve, the latter is provided with a stem 33 which protrudes with a suitable clearance through the central opening of the cap piece and terminates in a head 35 between which and the cap there is provided a spring 37. Between the spring and the head 35 there is provided a U-shaped rest 39 movable with the stem relatively to the cap. When the bottle is inverted and placed in the bowl, the U-shaped rest seats on a raised annular lip 41 in the bottom of the bowl and serves to support the bottle, while at the same time the valve is lifted and the spring 37 compressed through the abutment of the stem head 35 against the bottom of the bowl. The oil within the bottle flows into the bowl until its level is sufficient to seal the delivery opening through the bottle cap. If the bottle is lifted, however, for withdrawal from the bowl, the spring expands causing the valve to close the mouth of the bottle, the U-shaped rest moving with the stem away from the bottle cap.

Referring now to the construction of the supply device, the latter is provided with a transverse partition 43 which separates the interior of the bowl into two compartments, one an oil receiving chamber 45 in which the mouth of the bottle is inserted, and the other a delivery chamber 47 from which the oil gravitates to the burner. Centrally beneath the delivery chamber, the casting is formed to provide a settling chamber 49 separated from the delivery chamber by means of a screen 51. The latter has its edges resting on a circumferential shoulder formed at the bottom of the delivery chamber and is held in position by a spider ring 53 which is clamped at its center by the screw 55 to the top of a boss 57 which extends upward through the middle of the settling chamber 49. An oil supply passage is formed through the screw 55 and the boss 57 so that oil is adapted to flow from the delivery chamber centrally through the boss and into the supply pipe 21, which latter is threaded into the bottom of the casting. A removable cover plate 59 is provided to cover the entire irregularly shaped top of the delivery chamber 47.

The partition wall 43 cuts off direct communication between the delivery chamber 47 and the receiving chamber 45, but a passage 61 is provided leading from the bottom of the receiving chamber to the side of the settling chamber and permitting the oil to pass from the former to the latter, from which it must ascend through the screen 51 before entering the delivery chamber 47.

Arranged at the side of the bowl casting 11 there is provided an upright lug or enlargement 63 having an open-mouthed chamber providing a well or sump 65. The bottom of the well communicates with the supply chamber by a lateral passage 67. At the bottom of the well there is provided a drain opening in the casting which is normally closed by the threaded piece 69.

In the starting of burners of the type referred to it is common to employ a lighted taper for initially igniting the oil. After the oil has been ignited the taper may be inserted in the sump in an inverted position, the immersion of its lighted end in the liquid fuel at the bottom of the sump causing the extinguishment of the taper flame. This provides a convenient receptacle for holding the taper until next required for use, and when withdrawn from the sump the end of the taper is already saturated with oil and can be readily again ignited.

In the operation of this device, the oil on escaping from the bottle fills the oil receiving compartment 45 to approximately the level indicated, the oil gravitating thence down into the settling chamber 49 and then ascending through the screen into the delivery chamber 47, from which it gravitates as required through the supply opening and the supply pipe 21 to the burner. The settling chamber not only provides for the gravity separation of dirt and other heavy impurities, but oil is caused to ascend through the screen before reaching the delivery chamber, which removes any lighter foreign particles. The oil, therefore, reaches the burner free from dirt and other impurities, the latter gravitating to the bottom of the settling chamber or being removed by the screen. By withdrawing the threaded member 69, the bottom of the sump chamber is opened and the oil may be drawn off from the settling chamber and the bowl as well as any residue from the bottle if required.

While we have herein shown and described for the purposes of illustration one specific embodiment of the invention and one particular application thereof, it is to be understood that extensive deviations may be made from the embodiment herein shown without departing from the spirit of the invention.

What is claimed is:

1. A constant-level fuel feeding device for liquid fuel burners comprising a constant-level supply receptacle for the burner, said receptacle having a fuel delivery chamber and a settling chamber below said delivery chamber and presenting also an upright, open-mouthed, taper holding well communicating with the settling chamber at its bottom, and a removable closure for the bottom of the well to drain the receptacle.

2. A constant level fuel feeding device comprising a delivery chamber, a settling chamber therebelow, a screen separating said settling chamber from said delivery chamber, a discharge conduit leading from said delivery chamber, a receiving chamber separate from said delivery chamber but communicating with said settling chamber and thence, through said screen, with said delivery chamber, and means for maintaining a constant liquid level in said receiving chamber at a height above that of said screen.

3. In combination with an oil burner of the class described, a barometric fuel feeding device comprising a delivery chamber, a settling chamber therebelow, a screen separating said settling chamber from said delivery chamber, a discharge conduit leading from said delivery chamber to said oil burner, a receiving chamber separate from said delivery chamber but communicating with said settling chamber and thence, through said screen, with said delivery chamber, and a reservoir positionable in liquid sealed supply relation to said receiving chamber for maintaining a constant liquid level therein at a height above that of said screen.

4. A barometric fuel feeding device comprising a receptacle presenting a constant level receiving chamber adapted to receive a reservoir in liquid sealed supply relation thereto and presenting at the side thereof a partitioned fuel delivery chamber, a discharge conduit leading from said delivery chamber, a settling chamber communicating with the receiving chamber and positioned at a level below that of the delivery chamber, a screen in the path of liquid flow between the settling chamber and the delivery chamber, and a support on which said receptacle is vertically adjustable.

5. The combination with a liquid fuel burner, of a constant level fuel supplying device therefor and a conduit connecting said device and burner, said device comprising a receptacle presenting a constant level receiving chamber adapted to receive a reservoir in liquid sealed supply relation thereto and presenting at the side thereof a partitioned fuel delivery chamber having an outlet communicating with said conduit, a settling chamber communicating with the receiving chamber and positioned at a level below that of the delivery chamber, a screen in the path of liquid flow between the settling chamber and the delivery outlet, and a support on which said receptacle is vertically adjustable.

6. A constant level bowl to a barometric fuel feeding device, having a lower portion constituting a settling chamber, a bottleneck receiving section extending upwardly from and communicating with said lower portion and open at the top to receive the mouth of a barometric feed jar, a delivery section also extending upwardly from and communicating with said lower portion, and forming a delivery chamber into which the liquid flows upwardly from said lower portion of said bowl to a height corresponding to the level of the feed jar mouth in said neck receiving section, said sections being separated by a wall of said bowl, and an outlet from said delivery chamber above the inlet thereto and below the height reached by the liquid therein for delivering liquid under the head in said delivery chamber only after it has settled in said lower portion and then passed upwardly into said delivery chamber.

7. A constant level fuel receptacle to a barometric fuel feeding device, having a portion constituting a settling chamber, a fuel receiving section extending upwardly from and communicating with said settling chamber and open at the top to receive the mouth of a barometric feed vessel and from which the liquid flows downwardly into said settling chamber, a delivery section also extending upwardly from and communicating with said settling chamber and constituting a delivery chamber into which liquid flows upwardly from said settling chamber to a height corresponding to the level of the feed vessel mouth in said fuel receiving section, said fuel receiving section and said fuel delivery section being separated by a wall of said receptacle, and an outlet from said delivery chamber above the inlet thereto and below the height reached by the liquid therein for delivering liquid under the head in said delivery chamber only after it has settled in said settling chamber and then passed upwardly into said delivery chamber.

8. A constant level fuel receptacle according to claim 7, said receptacle being provided with a screen in the path of flow of the oil passing from said settling chamber to said outlet.

9. A constant level fuel receptacle to a barometric fuel feeding device, having a portion constituting a settling chamber, a fuel receiving section extending upwardly from and communicating with said settling chamber and open at the top to receive the mouth of a barometric feed vessel and from which the liquid flows downwardly into said settling chamber, a delivery section also extending upwardly from and communicating with said settling chamber and constituting a delivery chamber into which liquid flows upwardly from said settling chamber to a height corresponding to the level of the feed vessel mouth in said fuel receiving section, said fuel delivery section being arranged at one side of said fuel receiving section and being separated therefrom by a wall of said receptacle, and an outlet from said delivery chamber above the inlet thereto and below the height reached by the liquid therein for delivering liquid under the head in said delivery chamber only after it has settled in said settling chamber and then passed upwardly into said delivery chamber.

10. A constant level bowl according to claim 6 further having a screen at the bottom of its delivery chamber through which the liquid passes in flowing upwardly from the settling chamber to the delivery chamber.

11. A constant level bowl according to claim 6 further having a taper holding well extending upwardly from and communicating with its said lower portion, so that any sediment therefrom will be trapped in the settling chamber.

12. The combination with a liquid fuel burner, of a constant level supply receptacle for said burner, a supply conduit connecting said receptacle and burner, means for holding a taper in communication with the liquid fuel in said receptacle, a taper removably insertable in said means and a screen which isolates said taper from the body of oil in communication with said conduit; said combination assuring a supply of fuel for the torch so long as fuel is available for supply to said burner, while keeping soot and foreign matter from said torch-holder from reaching and clogging said conduit and burner.

13. The combination with a liquid fuel burner, of a constant level supply receptacle for said burner, a supply conduit connecting said receptacle and burner, means for holding a taper in communication with the liquid fuel in said receptacle, a taper removably insertable in said means and means to provide for separation of sediment prior to oil flow through said conduit; said combination assuring a supply of fuel for the torch so long as fuel is available for supply to said burner, while keeping sedimentary matter from said torch-holder from reaching and clogging said conduit and burner.

In testimony whereof, we have signed our names to this specification.

RALLSTON M. SHERMAN.
ALFRED J. GILBERT.